Dec. 3, 1968   G. BRAUMANN   3,414,851
MULTIPLE CONTACT RELAY STRUCTURE AND SYSTEM
Filed Sept. 23, 1966   8 Sheets-Sheet 1

Dec. 3, 1968    G. BRAUMANN    3,414,851
MULTIPLE CONTACT RELAY STRUCTURE AND SYSTEM
Filed Sept. 23, 1966    8 Sheets-Sheet 2

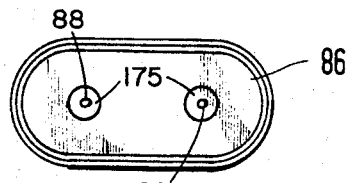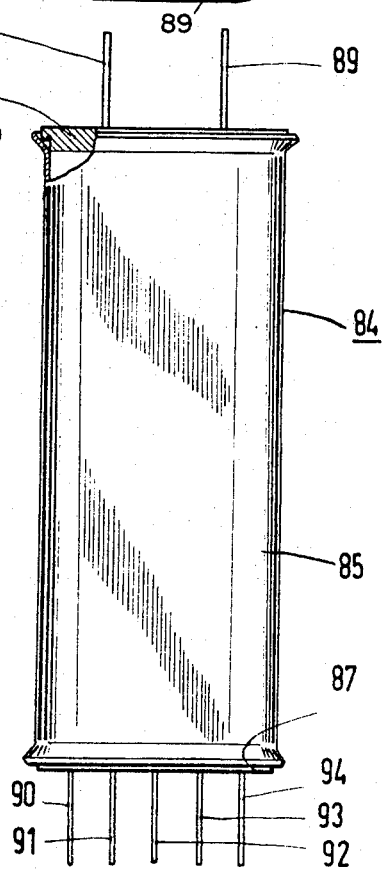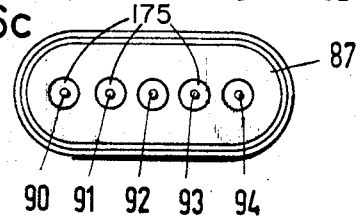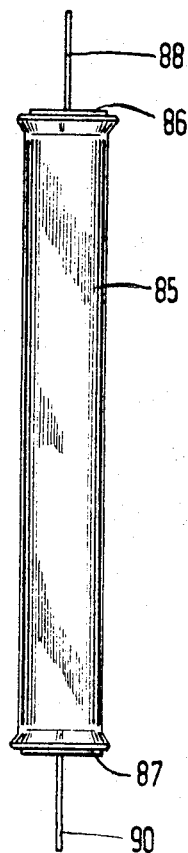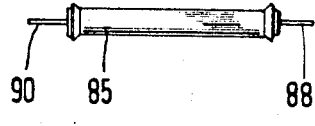

Dec. 3, 1968 G. BRAUMANN 3,414,851
MULTIPLE CONTACT RELAY STRUCTURE AND SYSTEM
Filed Sept. 23, 1966 8 Sheets-Sheet 6
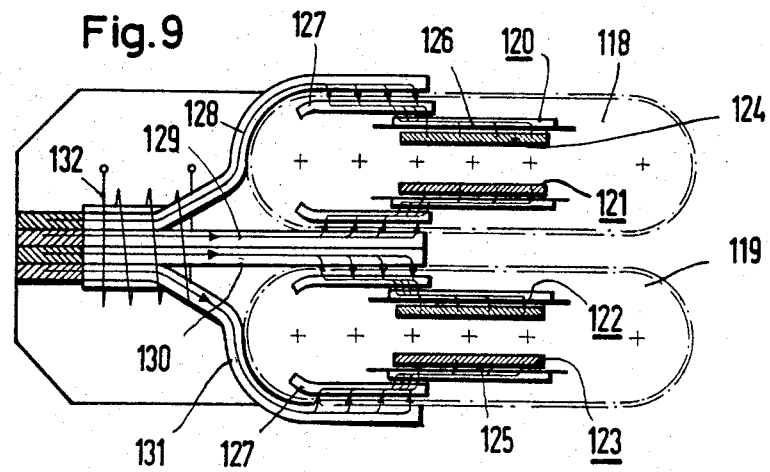
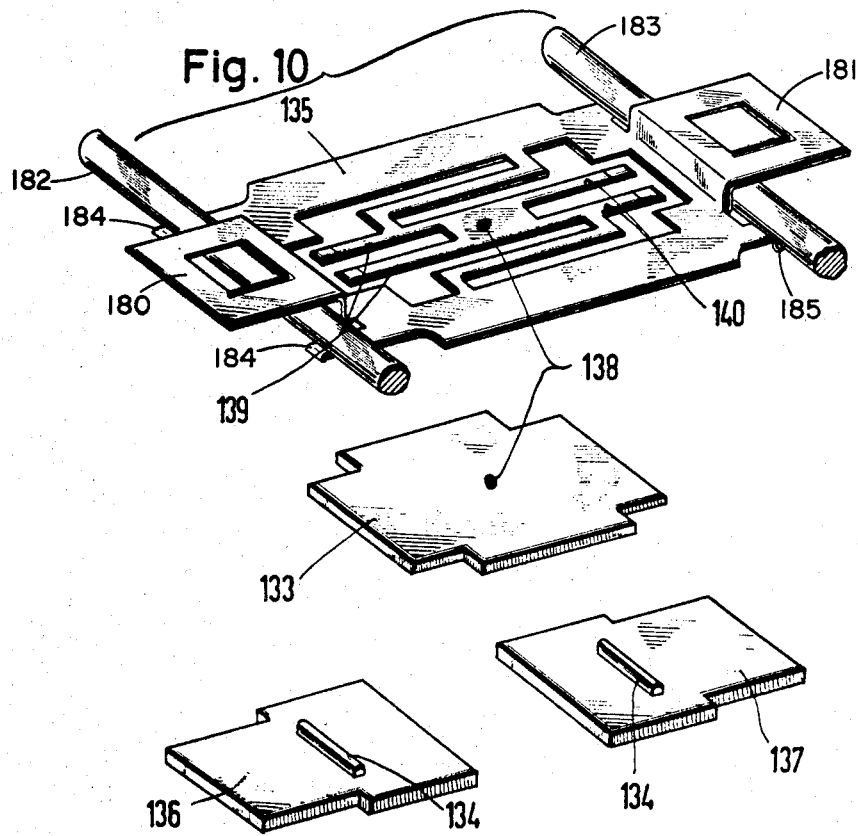

United States Patent Office 3,414,851
Patented Dec. 3, 1968

3,414,851
MULTIPLE CONTACT RELAY STRUCTURE AND SYSTEM
Gundokar Braumann, Munich, Germany, assignor to Siemens Aktiengesellschaft, a corporation of Germany
Filed Sept. 23, 1966, Ser. No. 581,559
Claims priority, application Germany, Sept. 30, 1965, S 99,785
36 Claims. (Cl. 335—106)

ABSTRACT OF THE DISCLOSURE

A relay structure comprises a magnetizable armature which can be actuated to assume a plurality of contact positions, by either movable permanent magnets or by electromagnetic means. The relay structure described herein, provides four possible relay positions. Further, a plurality of basic relay structures can be used in a relay circuit system, providing a multiplicity of through connections between the inputs and outputs of the system. Since the relay structure is comprised of components requiring little space, the relay system can be conveniently housed in a compact tubing, which may be sealed from the atmosphere, thereby increasing the useful life of the components.

Cross reference to related application

Applicant claims priority from corresponding German application Ser. No. S 99,785, filed Sept. 30, 1965.

More particularly, the relay structure comprises a leaf spring having dual contact arms on each side thereof, and which is pivotably attached to a first pole plate. A magnetizable armature is affixed to the center of the leaf spring, the combination being spacedly supported from associated second and third pole plates. A contact link is attached to each of the second and third pole plates. Air gaps are defined between the armature and the second and third pole plates, and all relay components substantially comprise parallel flat plates.

The relay structure is operative when it is subjected to a magnetic field. Thus, if a magnetic field is created between the left end of the first pole plate and the second pole plate, the left end of the armature will be magnetized and will be attracted to the second pole plate. Similarly, if a magnetic field is created between the right side of the first pole plate and the third pole plate, the right side of the armature will be magnetized and will be attracted to the third pole plate. Since the leaf spring is fastened to the armature, attraction of the left side of the armature towards the second pole plate will force the left contact arms of the leaf spring to be connected to the contact link attached to the second pole plate.

Similarly, magnetization of the right side of the armature will cause the right side of the armature to be attracted to the third pole plate. Under these circumstances, the contact arms on the right side of the leaf spring will operatively be connected to the contact link on the third pole plate.

If two magnetic fields are present, so as to cause both sides of the armature to be magnetized, the armature will be attracted to both second and third pole plates, thereby causing both the right and left contact arms of the leaf spring to be connected to associated contact links of the second and third pole plates, respectively.

This basic relay structure can be multiplied to include a plurality of such relay structures in a circuit system to effect a plurality of through connections. It is seen that four different circuit positions are available. These are the rest position in which magnetic fields are not present, the two selectively one-sided operation positions of the contact arms, and finally, the double-sided operation position of the contact arms.

Further, the first pole plate, and the second and third pole plates are insulated from each other. Therefore, by making all pole plates, as well as the armature, from current conducting magnetizable materials, actuation of the armature to contact the second and/or third pole plates will serve as an electrical contact connection. This will decrease the need for additional relay structure components.

This invention also provides for isolation between the magnetic and electrical circuit paths. Thus, the contact arms of the leaf spring extend outwardly from the leaf spring to a length sufficient to be outside the magnetic field existing between the first pole plate, and the second and third pole plates. Thus, the electrical impulses fed through the contact arms of the leaf spring, are not subjected to the magnetic fields, which could possibly cause the induction of currents therein, since the contact arms move upon armature actuation, in the presence of a magnetic field.

Utilization of a plurality of basic relay structures in combination, to form a circuit system is also the subject of this invention. Thus, the relay structures can be combined in various ways. For example, a structural unit comprising five relay structures can be arranged in a plane, such that their air gaps lie in series in uninterrupted succession. Alternatively, two relay structures can be arranged one on top of the other, with the second and third pole plates of each structure facing each other. The multiple arrangement can also be carried out in a manner such that two relay structures face each other, in a mirror image arrangement, such that their first pole plates face each other.

All these multiple arrangements have the advantage that a savings in space is achieved, and the wiring for the circuitry is simplified. Further, utilization of a multiple arrangement of the basic relay structure to form a multiple relay circuit system, can be achieved in such a manner that the first pole plates of the respective structure overlap, and thereby produce a combined magnetic field which substantially reduces the energizing power required to actuate the armatures, and simultaneously increases the operational speed of the relay; that is, armature response to changes in the magnetic fields.

The basic relay structure easily lends itself to armature actuation rejuiring coincidental energization of the electromagnetic windings associated with the left and right side of the armature. Thus, the magnetic flux conducting path can be arranged such that energization of only one winding effects short circuiting of the magnetic field so that it will not magnetize the armature. However, coincidental energization of the exciter windings to create the electromagnetic fields, and polarization of the windings such that they produce electromagnetic fields which then buck each other in the short circuit path, will force the magnetic flux to flow through the air gaps, thereby magnetizing and actuating the armatures.

In this regard, a relay system can be developed whereby the simultaneous energization of the windings will actuate all relay contacts. Another system that can be built using this basic relay structure employs a polarizing winding for each of the two exciting winding circuits, which will either short circuit the magnetic flux, or permit the magnetic flux to flow across the air gap, thereby magnetizing and actuating the armature, depending upon the polarity of the electrical signal applied to the exciter windings.

Prior art

The prior art relay devices teach the use of multiple contact relays, as well as the polarization and coincidence principles discussed. However, prior art relay devices normally involve the use of large bulky components, which are expensive to manufacture and difficult to combine in a compact unit. Further, because prior art relays utilize bulky components, energization levels are normally high. The prior art does not provide a four position relay structure which comprises a minimum number of relay components of the type described.

Objects of the invention

It is an object of invention to provide a relay structure having a minimum number of components and comprising substantially flat stamped plates, having at least four possible relay armature positions.

It is another object of the invention to utilize a plurality of said magnetic contact relay structures in specific arrangements and embodiments to provide a relay circuit system capable of producing a plurality of through connections, and having particular application to long distance communication networks, such as telephone systems.

It is another object of the invention to provide a relay structure of the type described, in which coincidence of at least two magnetic fields is essential for armature actuation.

It is still another object of the invention to utilize a plurality of basic relay structures arranged successively in a plane, such that the air gaps of each structure lie in series in uninterrupted succession.

It is another object of the invention to provide at least two relay structures arranged one on top of the other with the second and third pole plates of each structure facing each other.

It is another object of the invention to provide a plurality of basic relay structures, such that two relay structures face each other in a mirror image arrangement.

It is still another object of the invention to combine the basic relay structures in such a manner that the first pole plates of the respective structures overlap and thereby produce a combined magnetic field, substantially reducing the energizing power required to actuate the armatures.

Description of the invention

These and other objects of the invention will be apparent from the following specification and drawings in which:

FIGURES 6a–6d are right end; top plan; left end; and front views, respectively, of a protective tube which may be utilized to enclose and seal the relay circuit systems from the atmosphere;

FIGURE 7 is a front view of the protective tube illustrated in FIGURES 6a–6d, showing the protective tube in normal operable size;

FIGURE 9 is a partial sectional view of four relay structures arranged so that they comprise two relay systems arranged as mirror images one on top of the other, each relay system employing two basic relay structures;

FIGURE 10 is a perspective view in disassembled form of the leaf spring, armature, and second and third pole plates configuration that may be used in the relay system described in FIGURE 9;

Figure 1:
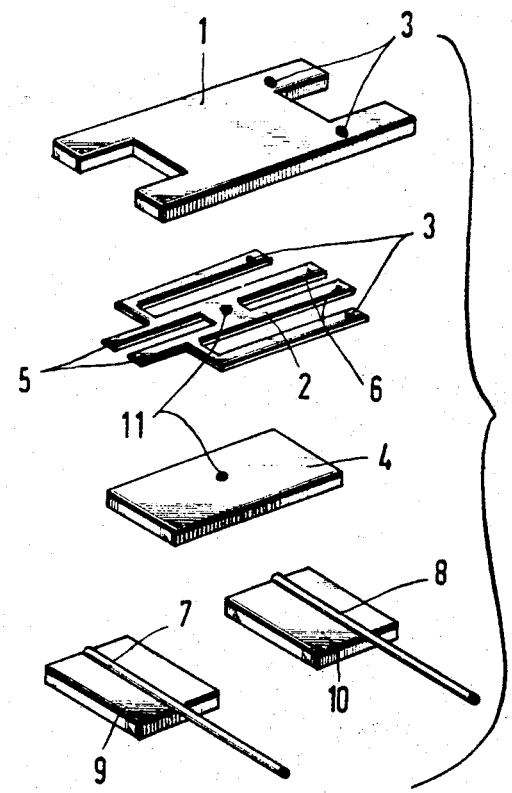
FIGURE 1 illustrates the various components of the basic relay structure in disassembled perspective representation.

FIGURE 1 illustrates the various elements in disassembled form, which comprise the basic relay structure. First pole plate 1 comprises magnetizable material, to which leaf spring 2 is pivotably secured at connection point 3. Connection 3 can be effected by soldering or welding, or other conventional means. Leaf spring 3 comprises contact arms 5 and 6 on either side thereof, which may be actuated to electrically connect with contact links 7 and 8, respectively. Contact arms 5 and 6 each comprise dual contact arms to ensure proper electrical connection to contact links 7 and 8. Thus, should one of the arms comprising contacts 5 and 6 not function to effect electrical connection to its associated contact link because of dirt or grit deposited thereon, the other arm will ensure completion of the connection. Furthermore, the use of a plurality of contact arms to effect the electrical connections, increases the current carrying capacity of the contacts, since parallel current paths are thereby provided, and thus increases contact arm life.

As further illustrated in FIGURE 1, armature 4 is fixed to leaf spring 2 at connection point 11, by soldering or welding methods. The armature, leaf spring, and pole plates comprise flat plates that can be stamped from sheets, to minimize space requirements of the relay structure, and reduce the manufacturing cost.

Figure 2:
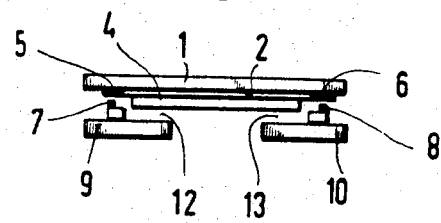
FIGURE 2 is a front view of the relay structure described in FIGURE 1 in assembled operable arrangement.

As shown in FIGURE 2, the second and third pole plates 7 and 8, respectively, are spacedly positioned from the combination of the first pole plate 1, leaf spring 2, and armature 4. Contact links 7 and 8 are attached mechanically and electrically to second and third pole plates 9 and 10, respectively, and preferably comprise round electrical wire conductors. Gaps 12 and 13 define air gaps between the first pole plate 1 and the second and third pole plates 9 and 10, respectively. It is thus seen that the components comprising the relay structure are arranged substantially parallel to each other.

If then, a magnetic field is created such that a magnetic flux path exists between first pole plate 1 and second pole plate 9, the left end of magnetizable armature 4 will be magnetized and will be attracted to second pole plate 9 across air gap 12, assuming the magnetic field is of sufficient strength to overcome the counterforce of leaf spring 2. When armature 4 contacts second pole plate 9, in which position armature 4 is slanted between first pole plate 1 and second pole plate 9, contact arms 5 are electrically connected to associated contact link 7. Similarly, if a magnetic field is created between first pole plate 1 and third pole plate 10, such that a magnetic flux path is created across air gap 13, the right side of armature 4 will be magnetized and will be attracted to second pole plate 10, thereby countering the force of leaf spring 4 (assuming the magnetic field is sufficient to overcome said counterforce). In this condition, armature 4 via its attachment to leaf spring 2 will effect an electrical connection between contact arms 6 and associated contact link 8.

If coincident magnetic fields are developed between first pole plate 1, and second and third pole plates 9 and 10 across air gaps 12 and 13, respectively, then both ends of armature 4 will be magnetized and attracted to pole plates 9 and 10. Thus, contact arms 5 and 6 will be operatively connected to their associated contact links 7 and 8, respectively, thereby effecting simultaneous electrical connections thereto.

The selective actuation of the armature as explained above, coupled with the maintenance of the electromagnetic field or fields effecting said actuation, will result in the associated relay contact position being maintained, the magnetic circuit being completed between the pole plates through the armature.

When the magnetic field or fields are removed, leaf spring 2 forces the armature back to the rest position illustrated in FIGURE 2. Thus the leaf spring 2 serves to reset the armature.

Depending upon the contact arm or arms actuated, electrical signals applied to pole plate 1 will be selectively fed to either or both of contact links 7 and 8 through the contact arms of the leaf spring. Further, if the first pole plate, and the second and third pole plates are insulated from each other, and if the armature and second and third pole plates, as well as the first pole plate, are electrically conductive, electrical signals at the first pole plate can also be selectively fed to the second and/or third pole plate through the armature. This will increase the current carrying capacity of the relay structure, since the capacity will not be limited by the size of the contact arms.

The relay system can also be equipped with a variety of types of special contacts, as for example, commutation contacts, succession contacts, etc. by using additional contact links associated with the armature, to complete other electrical connections selectively dependent on the armature position. This is another reason why the pole plates and armature are preferably both good magnetic and electrical conductors.

Contact arms 5 and 6 extend from leaf spring 2 and are of sufficient length so as to be outside the magnetic fields developed between first pole plate 1, and pole plates 9 and 10. Thus the magnetic flux flows from first pole plate 1 to the magnetizable armature, since it offers least reluctance thereto, and is connected by the armature within air gaps 12 and 13. Contact arms 5 and 6 are thus outside the magnetic fields. Isolation of the electrical circuit comprising the contact arms from the magnetic circuit is particularly advantageous to avoid induction of undesirable voltages in the contact arms that may result from movement within a magnetic field.

Four possible relay positions are possible, depending upon the magnetic field or fields developed between first pole plate 1 and second and third pole plates 9 and 10. These are:

(1) The rest position illustrated in FIGURE 2, wherein neither contact arms 5 nor contact arms 6 are connected to their associated contact links 7 and 8, respectively.

(2) The single contact position wherein contact arms 5 are operatively connected to associated contact link 7.

(3) The single contact position wherein contact arms 6 are operatively connected to associtaed contact link 8.

(4) The dual contact position wherein both contact arms 5 and 6 are coincidentally connected to associated contact links 7 and 8, respectively.

It is thus seen that the relay structure disclosed is extraordinarily versatile with regard to the number of contact positions available, and is therefore adaptable to a variety of uses. Also, because the relay structure has minimum space requirements, and uses easily and cheaply manufactured elements, it is relatively inexpensive to produce and assemble. Further, utilization of relatively lightweight components minimizes the energizing power required to actuate the relay.

Figure 3:
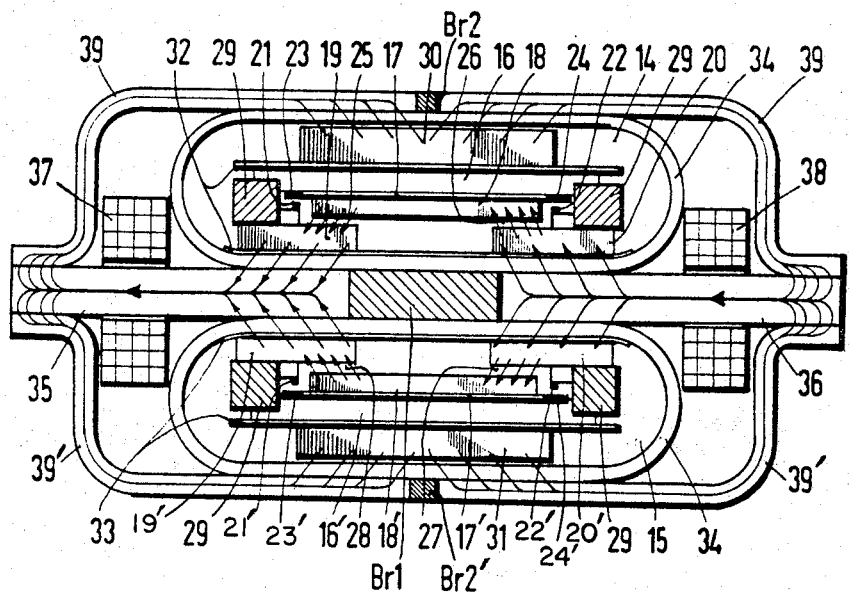
FIGURE 3 is a sectional view of two relay structures housed in protective tubes, and arranged one on top of the other with the second and third pole plates of the respective structures facing each other.

FIGURE 3, illustrates a relay system, wherein two relay structures as described in FIGURES 1 and 2 are utilized. Relay structures 14 and 15 comprise first poles 16 and 16', respectively, to which leaf springs 17 and 17' are secured. Armatures 18 and 18' are pivotally fastened to leaf springs 17 and 17', respectively. Second and third pole plates 19 and 20', and 19' and 20', are spaced in operable relation, respectively, to pole plates 16 and 16'. Pole plates 19, 20, 20' and 22' comprise contact links 21, 22, 21' and 22' which co-act with contact arms 23, 24, 23', 24', respectively, comprising extensions of leaf springs 17 and 17'. Air gaps 25 and 26, and 27 and 28, respectively, comprise a path to complete the magnetic flux path of relay structures 14 and 15, between the associated first, second and third pole plates.

The electromagnetic field can be provided by either electromagnetic means, or by permanent magnets. FIGURE 3 illustrates exciter windings 37 and 38 which are wound around magnetic cores 35 and 36, respectively, to energize the electromagnets and produce the desired electromagnetic fields. However, windings 37 and 38 may each comprise two individually connectible windings: a response winding, and a hold winding. Energization of the response winding initially actuates the armature to contact the second and/or third pole. The hold winding is then used to maintain the contact, the holding energy required being substantially less than the initial response energy required.

First pole plates 16, and second and third pole plates 19 and 20, respectively, are spacedly mounted to support 29, comprising insulation material. The size of air gaps 25, 26, 27, and 28 are determined by the height of support 29; adjustment of the height of support 29, provides variation in the air gap size, and hence in the magnetic strength thereof.

Support 29 thus simultaneously provides a means for mechanically fastening the respective pole plates comprising each relay circuit in fixed spaced relationship, and for fixing the size and magnetic strength in the air gaps therebetween.

FIGURE 3 illustrates only one dual relay structure. However, it is to be understood, that a plurality of such relay structures may be utilized and mounted successively, vertically to the drawing plane of FIGURE 3. Plates 30 and 31 are magnetic flux conductors, which would then extend over all relay systems so arranged.

The magnetic flux conductor plates 30 and 31, serve to magnetically couple pole plates 16 to the magnetic circuit. In this regard, magnetic cores 35 and 36 are magnetically coupled to magnetic flux conductor plate 30 and 31 through magnetic couplers 39 and 39'.

Electrical insulation between the individual relay systems 14 and 15 is provided by insulation foils 32 and 33. Further, all relay systems 14 and 15, including those arranged successively vertically to the drawing plane of FIGURE 3 (not shown) are enclosed within an airtight protective housing 34 of nonmagnetizable material. However, air can be evacuated from protective tubes 34, and an inert gas may be introduced therein to increase the life of the switching system components, and prevent sediment from the atmosphere from being deposited thereon.

The system described in FIGURE 3 operates as follows: If winding 37 is electrically excited, an electromagnetic field will be created having the flux path illustrated in FIGURE 3. That is, the magnetic flux will flow from core 35, through magnetic coupler 39, to magnetic flux conductor plate 30. First and second pole plates 16 and 19, respectively, are magnetically coupled to magnetic flux conductor plate 30, and to core 35, respectively. The flux path is completed between pole plates 16 and 19, across air gap 25. The magnetic flux therein magnetizes and actuates the left end of armature 18 in such a manner as to operatively connect it to pole piece 19, counter to the force of leaf spring 17. This will effect electrical connection between dual contact arms 23 and contact links 21.

Further, electrical actuation of winding 37, causes a magnetic flux flow from core 35 through magnetic coupler 39, to magnetic flux conductor plate 31, in relay system 15. Since first pole plate 16' and second pole plate 19' are magnetically coupled to the flow conductor paths via magnetic core 35 and magnetic flux conductor plate 31, respectively, the magnetic flux path will be completed across air gap 28 through the left end of armature 18'.

Provided the electromagnetic field created by the excitation of winding 37 is sufficient to overcome the counterforce of leaf spring 17', the left end of armature 18' will be actuated to operatively connect with pole plate 19'. This will effect connection between dual contact arms 23' and contact link 21'.

Excitation of winding 38 also functions in a similar manner to create the magnetic flux flow path illustrated in FIGURE 3 core 36 to second pole plate 20, across air gap 26 and is magnetically coupled back to magnetic core 36 through magnetic coupler 39. Completion of the magnetic flux path across air gap 26 and armature 18 to first pole plate 16, causes magnetization of the right end of armature 18, and its subsequent connection to second pole plate 20. Operative connection of armature 18 to second pole plate 20, effects electrical connection between contact arms 24 and its associated contact link 22. Similarly, excitation of electrical winding 38, effects electrical contact between contact arms 24' and associated contact link 22'.

The above description is directed solely to the functioning of the relay systems, when only one of windings 37 and 38 are excited. As shown, the respective armatures 18 and 18' of relay systems 14 and 15, can each be actuated to effect one electrical connection. However, simultaneous electrical excitation of windings 37 and 38, will serve to effect double electrical connections for each system. Thus, if both windings are coincidently excited to create the two magnetic flux paths illustrated in FIGURE 3, both the right and left ends of the armatures 18 and 18' will be simultaneously magnetized, and attracted to their respective second pole plates. In relay system 14, this will cause an operative electrical connection to be made between contact arms 23 and contact link 21, and contact arms 24 and contact link 22. With regard to relay system 15, electrical connection will be effected between dual contact arms 24' and contact link 22', and between dual contact arms 23' and contact arm 21'. Therefore, in each system, four switch positions of the relay are possible: the rest position (illustrated in FIGURE 3); the two single contact positions; and the double contact position.

The basic arrangement illustrated in FIGURE 3, can also be operated according to the magnetic coincidence principle. This is achieved by the insertion of magnetizable elements BR1 and BR2 and BR2'. BR1 is inserted between the ends of magnetic cores 35 and 36; and magnetizable element BR2 and BR2" are inserted in the center portions of magnetic couplers 39 in relay systems 14 and 15, respectively. Further, exciter windings 37 and 38 should be poled in such a manner, that the ends of the windings facing each other are similarly poled. Under these circumstances, if winding 37 is excited alone, the magnetic flux will flow from core 35 through magnetic coupler 39 and magnetizable block BR2, through core 36 and magnetizable material BR1, back to core 35, in relay system 14. In relay system 15, the magnetic flow will be from core 35 through magnetic coupler 39', and magnetizable material BR2', to core 36, and return to core 35 through magnetizable material BR1. Thus, armatures 18 and 18' of relay systems 14 and 15, respectively, will not be actuated since a magnetic flux potential will not be developed across the pole plates of the systems, because the reluctance of the magnetic paths described is much lower than that across the magnetic paths including air gaps 25 and 28. In effect, the air gaps will be magnetically short circuited.

A similar magnetic flow path will be created if winding 38 alone is excited. That is, the magnetic flux will flow through cores 36 and 35, and magnetic couplers 39 and 39' because the reluctance thereof is reduced substantially as a result of the insertion of magnetizable elements BR1 and BR2 and BR2', and provides a short circuit to the magnetic flux, thereby preventing magnetization of armature 18 and 18' in air gaps 25, 26, 27 and 28.

However, when both windings are excited simultaneously, the magnetic fields created as a result of poling windings 37 and 38 create bucking magnetic fields. This necessitates separate flux paths. Thus, assuming a clockwise flux path is developed as a result of excitation of winding 37, it will proceed from core 35 to magnetic coupler 39. Similarly, assuming winding 38 is polarized such that the right end of winding 37 is the same magnetic polarity as the left end of winding 38, a bucking magnetic field will be created. That is, the magnetic flux will be counterclockwise, and will proceed from core 36 to magnetic coupler 39. Thus, it is seen at the midpoint of magnetic coupler 39, the two magnetic fields will be opposite in polarity and amplitude and will buck each other. To provide a complete magnetic path, the flux created as a result of winding 37 will flow from magnetic coupler 39 to the left end of magnetic flux conductor and first pole plate 16, second pole plate 19 and plate 30, across air gap 25 to return to core 35.

The magnetic flux created as a result of excitation of winding 38 will flow from magnetic coupler 39 to the right end of magnetic flux conductor plate 30 across air gap 26 to second pole plate 20 and first pole plate 16 and back to core 36. It is thus seen that both ends of armature 18 and 18' will be magnetized and attracted to associated second pole plates.

This will cause the left end of armature 18 to contact pole plate 19, and the right end of armature 18 to contact pole plate 20. As explained heretofore, this in turn will cause contact arms 23 and 24 to be operatively connected with contact links 21 and 22, respectively.

The coincidence principle, as described in relation to relay system 14, is also applicable to relay system 15. Thus, polarizing windings 37 and 38 in such a manner provides operation of the relay only when both windings are coincidentally energized. Operation of the relay system in such a manner provides two switch positions:

(1) The rest position illustrated in FIGURE 2;
(2) The double side contact connection resulting from coincident excitation of windings 37 and 38.

Figure 4:
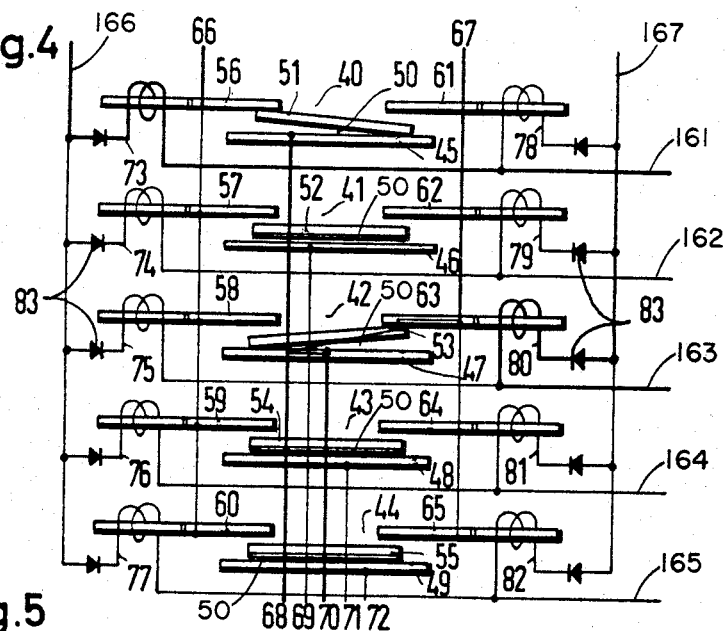
FIGURE 4 is an electrical schematic drawing of five relay structures comprising a coupling unit, to effect a plurality of through connections, and having particular use in long distance communication systems, such as telephone installations.

FIGURE 4 illustrates five electromagnetically operable relay systems of the type described in FIGURES 1 and 2 electrically coupled together to comprise a coupling unit. Relay systems 40–44 each comprise a first pole plate 45–49, respectively; a leaf spring 50; and armatures 51–55, respectively. Further, each of said systems 40–44, comprise two second pole plates opposite from said first pole plates 45–49. These are respectively second and third pole plates 56 and 61; 57 and 62; 58 and 63; 59 and 64; and 60 and 65.

Second pole plates 56–60 are electrically coupled together by common connection line 66. Third pole plates 61–65 are electrically connected together by common connection 67. Each of the first pole plates 45–49 have separate electrical connections 68–72, respectively.

It is thus seen that a multiplicity of through connections can be made between connection lines 68–72 and common connection lines 66 and 67. Diodes 83 and 83' polarize windings 66–82 so that they will conduct in only one direction. As illustrated in FIGURE 4, exciter current is fed from connection line 166 to windings 73–77 through the common cathode connections of diodes 83 to line 166. Further, exciter windings 78–82 are fed through the common cathode connections of diodes 83' to line 167. The exciter winding circuitry of each of the relay systems 40–44 may be completed by selectively connecting connection lines 161–165 to the other input terminal of the supply source supplied to common connection lines 166 and 167, respectively.

The specific relay contact arrangement illustrated in FIGURE 4 shows the energization of exciter windings 73 and 80 as an example. Relay system 40 comprises exciter windings 73 and 78; however, since diode 83' of relay system 40 is poled oppositely to diode 83, winding 78 will not be energized when winding 73 is energized from input 166. Likewise, diode 83 of relay system 50 is poled oppositely to diode 83'. Hence, only exciter winding 80 will be energized, and not exciter winding 75, from input 167. Under these conditions a through connection will be made between common connection line 66 to connection line 68 via first pole plate 45, armature 51, and second pole plate 56 of relay system 40. Also, a connection will be made between common connection line 67 and connection line 70, via third pole plate 63, armature 53, and first pole plate 47 of relay system 42. It is apparent that energization of selected others of exciter windings 73–82 will effect different through connections in the coupling unit.

Figure 5:
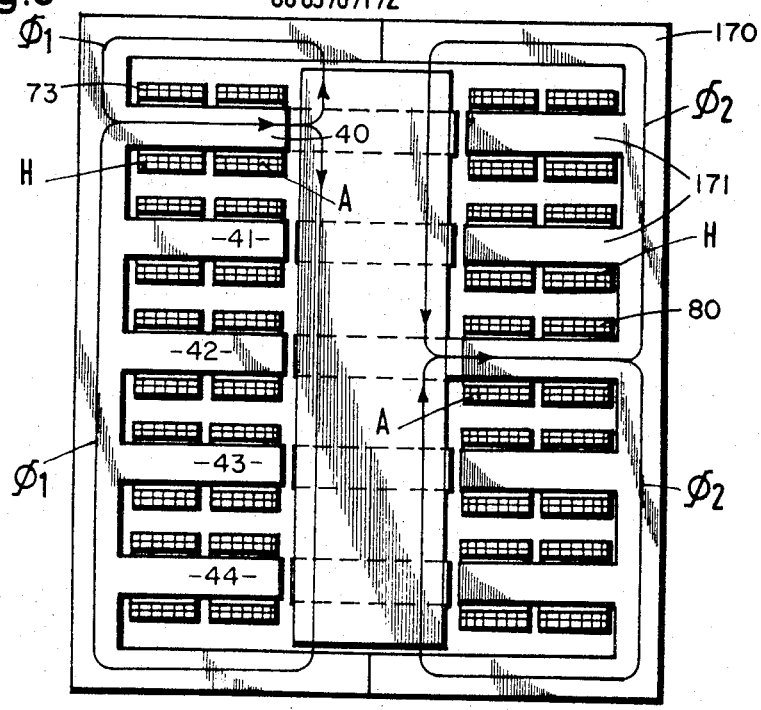
FIGURE 5 is a front view of the relay circuit system arrangement illustrated in FIGURE 4 showing the vertical magnetic flux paths therein.

FIGURE 5 illustrates a mechanical arrangement of the coupling unit described in FIGURE 4. Thus, the five relay systems 40–44 shown in FIGURE 4 can be mounted successively vertically as shown in FIGURE 5. Further, they can be provided with a common magnetic flux conductor plate 172 of the type 30 discussed in relation to FIGURE 3. The armatures 51–55 of relay systems 40–44, respectively, are illustrated in FIGURE 5. However, the other components of each relay structure, including the first, second and third pole plates, and the leaf spring and associated contact links, are not shown. These are mounted substantially parallel to each other in the horizontal plane perpendicular to the drawing plane of FIGURE 5, beneath common magnetic flux conductor plate 172.

To further explain, it was discussed in relation to FIGURE 3, that the relay systems disclosed therein, could be multiplied and be successively mounted in the vertical direction. Thus, FIGURE 5 is essentially a front view of such a system, with the magnetic coupler (designated 39 in FIGURE 3) removed.

Further, the relay circuit of FIGURE 5 comprises a common magnetic coupling housing 170. Thus, energization of winding 73 of relay system 40 creates the vertical flux paths which flow from the right end of the core of relay system 40 to the magnetic flux conductor plate 172 and return to the left end of the core of relay system 40 through magnetic coupling housing 170. Shunt magnetic flow paths are, of course, produced since there are two return paths available to the magnetic flux through common magnetic flux conductor plate 172.

Energization of winding 80 of relay system 42 develops the vertical shunt magnetic flux paths extending from the right end of its associated core, through parallel paths in magnetic coupler 172, and back to the left end of said core through parallel paths in magnetic flux conductor 172.

FIGURE 5 illustrates only the vertical magnetic paths of the magnetic field, produced by energization of windings 73 and 80. These are respectively designated as $\phi1$ and $\phi2$. However, it must be appreciated, that the electromagnetic fields created by energization of windings 73 and 80, extend completely around the windings and their associated cores. Thus, a horizontal magnetic flux flow is also developed. The magnetic flux developed as a result of energization of winding 73 flows from the right end of the core of winding 73 to common magnetic coupling plate 172, through the relay structure comprising the first pole plate, the armature, and the second pole plate, and returns to the left end of the core of winding 73 through associated magnetic coupler elements (not shown) in the horizontal plane perpendicular to the plane of FIGURE 5. It is this horizontal component of the magnetic field that magnetizes and actuates the left end of armature 51.

A similar horizontal component of magnetic flux flows from the right end of winding 83, through magnetic coupler 170, through the relay components thereby magnetizing and actuating the right end of armature 53, and returns to the left end of winding 83 through magnetic flux conductor 172.

As described with relation to FIGURE 3, protective housings may also be utilized to increase the life of the various elements comprising the relay structures. Thus, FIGURES 6a–6d illustrate protective housing or tubing 84 comprising a plurality of relay systems in an air evacuated, inert gas filled, enclosure. Protective tubing 84 comprises an oval elongated capsule 85, having end plates 86 and 87. After inserting and mounting the various relay systems and supporting circuitry within capsule 86, end plates 86 and 87 are soldered or welded to oval capsule 85. Electrical connections 88–94 project through holes defined in end plates 86 and 87. These correspond to the electrical connections designated 66–72, respectively, in FIGURES 4 and 5.

Thus end plates 86 and 87 define a plurality of holes 175 corresponding to the number of electrical connections passing between the capsule and the outside, through the end plates. Conventional pressed glass fusing techniques may be used to effect electrical insulation among the various electrical connections passing through the end plates, and simultaneously provide a gastight sealing of the protective tube. That is, glass will be pressed and fused in holes 175, around the respective electrical connectors, providing glass stoppers to the atmosphere.

FIGURE 7 illustrates a protective tube substantially similar to that illustrated in FIGURES 6a–6d. Protective tube 85 is provided with end plates 86 and 87, through which electrical connectors 88–94 project. FIGURE 7 represents the actual size of protective tube 85.

Figure 8:
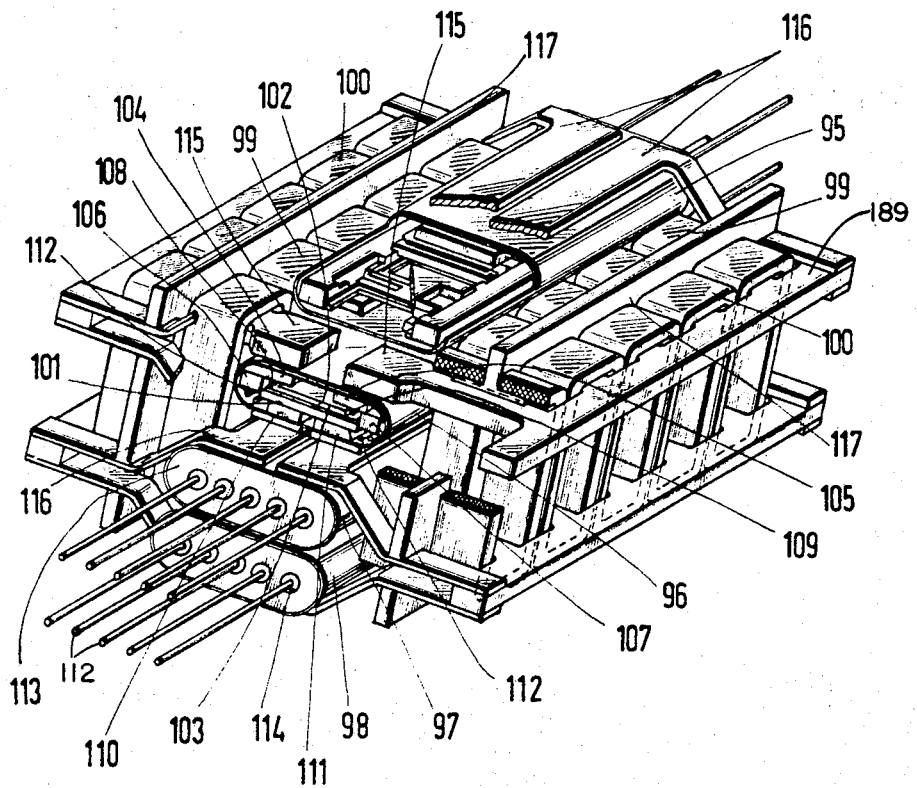
FIGURE 8 is a perspective view in partially cut-away section, illustrating a relay circuit system employing a series of four relay circuit systems of the type illustrated in FIGURES 4 and 5, each being enclosed in individual separate protective tubes arranged one on top of the other in an integral mounting.

FIGURE 8 illustrates a self-contained system utilizing four circuit systems, each comprising five relay systems of the type, for example, described in FIGURES 4 and 5. Thus, four separate protective tubes 95, 96, 97 and 98 are provided to seal each circuit system from the atmosphere. Since each relay structure comprises two electrical contact positions, the system illustrated in FIGURE 8 comprises a total of 40 electrical contact positions, each contact position being individually operable. Also, a plurality of the electrical contact positions can be effected simultaneously. Response windings 99 and hold windings 100 are provided to effect the desired relay contact positions.

Each relay system comprises a first pole plate 101 magnetically coupled to the cores of response windings 99 and hold windings 100, and a leaf spring 102 to initially position armature 103, and reset it upon termination of energization of windings 99 and 100. Further, windings 99 and 100 are mounted or wound around flow conductor tongues 115, which extend from common base section 189. Further, leaf spring 102 comprises dual contact arms, as explained and illustrated with relation to FIGURES 1, 2 and 3.

Each relay system also comprises second and third pole plates 104 and 105. Distance setting blocks 106 and 107 comprise insulation material, to which first pole plates 101, and second pole plates 104 and 105 are spacedly mounted. Finally, contact links 108 and 109 effect the electrical connection to associated contact arms of the leaf spring.

Common magnetic flux conductor plates 110 and 111 are used by the relay systems of each of the circuit systems, enclosed in the individual protective tubes 95–98. These serve to direct the magnetic flux across the air gap, thereby ensuring actuation of selected armatures.

Connectors 112 designate the connection lines to the relay coupling system illustrated in FIGURE 8. These correspond to the connectors designated 66–72 in FIGURE 4, and to connectors 88–94 in FIGURES 6a–6d, and project through end plates 113 of the protective tubes 95–98. As previously discussed, the connectors are insulated from each other by pressed fused glass stoppers 114.

The magnetic flux initially flows from windings 99 and 100 through flow conductor tongues 115, which as illustrated are jointly shared by two protective tubes arranged one on top of the other, through the respective magnetic flux conducting plates 110 and 111, across the relay components and the associated air gaps, and return to the electromagnets over outer flux conducting strips 116. Supports 117 provide mechanical means upon which the entire relay circuit system illustrated in FIGURE 8 may be mounted.

FIGURE 8 thus indicates the relative ease of mounting a plurality of relay systems as illustrated in FIGURES 1 2 to provide a multiplicity of relay contact positions, in a minimum amount of space. Further, the elements comprising each relay structure are relatively simple and inexpensive to manufacture, which when coupled with the fact that four contact positions can be effected with each relay system, clearly illustrates the advantages associated therewith.

FIGURE 9 is a partial schematic view of an electromagnetically operable relay strip using the basic relay system described in FIGURES 1 and 2. Within each of protective tubes 118 and 119, are mounted relay systems 120 and 121; and 122 and 123, respectively, arranged as mirror images, one on top of the other. Further, a plurality of successive relay systems can be mounted vertically to the drawing plane of FIGURE 9. As described in reference to FIGURES 1–8, each of the relay systems is arranged with a first pole plate 124, and a leaf spring 125 secured thereto serving to reset the armature upon the de-energization of the electromagnet windings. The armature is designated 126, and second and third pole plates 127 and 127′ (the latter not being shown) complete the relay system arrangement.

The second and third pole plates 127 and 127′ are co-extensive with all relay systems arranged successively vertically to the drawing plane, and are magnetically coupled to the end sealing plate of the protective tubes, through flux paths 128 and 129 for relay circuit system 121; and through flux paths 130 and 131 for relay circuit system 122. The exciter coils 132 are wound around flux path elements 128–131, and may comprise hold windings as well as response windings. Energization of winding 132 produces an electromagnetic field across the left side air gaps of relay circuit systems 121–124 to simultaneously actuate the four left sided contacts thereof. Similarly, exciter coil 132′ is wound around corresponding flux return path elements 128′–131′ (not shown) in a mirror image arrangement relative to winding 132 and its associated flux return path elements. Energization of exciter winding 132′ effects simultaneous actuation of the four right sided contacts of relay circuit systems 121–124. It is also apparent, that simultaneous energization of exciter windings 131 and 131′ will cause actuation of all eight contact positions illustrated in FIGURE 9. FIGURE 9 thus describes another physical arrangement of the basic relay system described in FIGURES 1 and 2, in a compact, easily mountable, arrangement.

FIGURE 10 represents an enlarged view of a leaf spring which may be utilized in the FIGURE 9 system arrangement. Thus, armature 133 is connected to leaf spring 135 at connection point 138. The connection can be effected by conventional means such as soldering or welding. The leaf spring serves to reset the armature upon de-energization of the exciter windings producing the electromagnetic field, or if permanent magnets are used, upon removal of the magnetic field from the air gap of the relay system. The leaf spring 135 provides and defines a specific geometric slit arrangement, which permits dual contact arms 139 and 140 to respond to the particular magnetic forces acting upon connected armature 133. That is, if the left side of armature 133 is magnetized and attracted to pole plate 136, dual contact arms 139 of leaf spring 135 will bend to contact associated contact link 134 thereby effecting an electrical connection thereto. On the other hand, if the right side of armature 133 is magnetized and attracted to pole plate 137, the right dual contact links 140 will bend and contact associated contact link 134′.

As described with reference to FIGURES 1–3, particularly, both sides of the armature can simultaneously be attracted to pole plates 136 and 137 simultaneously magnetically attracting the left and right sides of armature 133 to associated pole plates 136 and 137. This will effect simultaneous electrical contact between dual contact arms 139 and 140 and associated contact links 134 and 134′, respectively.

It is further noted that dual contact arms 139 and 140 extend beyond the armature 133, in the horizontal direction. The magnetic flux is concentrated in the armatures since it comprises a magnetizable material and therefore offers least reluctance to the magnetic flux flow. Therefore dual contact arms 139 and 140 are outside the magnetic field. This inherently provides isolation between the magnetic and electrical circuits.

FIGURE 10 further shows a convenient way of mounting the leaf spring. Thus, flanged portions 180 and 181 are supported respectively by support rods 182 and 183. It is apparent that with this arrangement, a plurality of leaf springs can be mounted on the same support rods 182 and 183, further simplifying mounting of the relay systems comprising a particular design arrangement. Each relay system is locked in place on support rods 182 and 183 by spring clips 184 and 185, respectively, which secure the rods tightly between flanged sections 180 and 181 and their respective spring clips.

Figure 11:
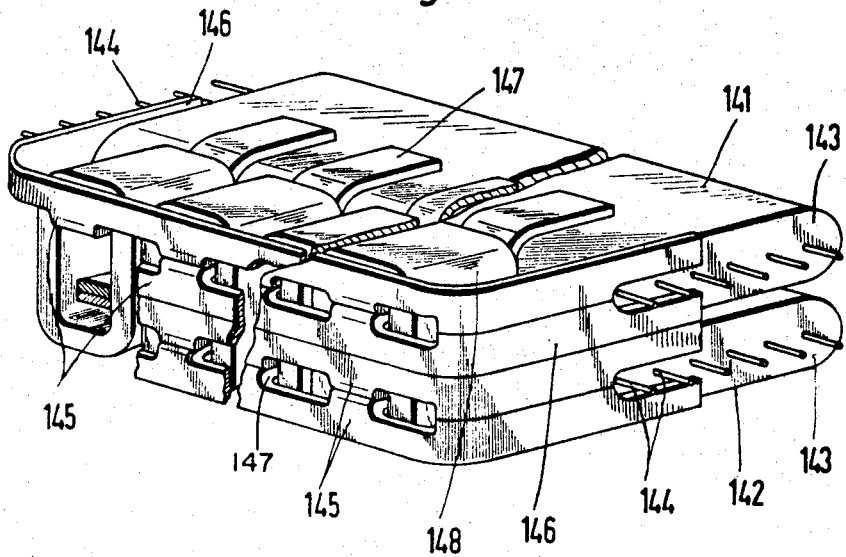
FIGURE 11 is a perspective view of the relay system of FIGURE 9 partially cut away to more fully describe said system.

The mechanical arrangement of a plurality of relay systems disclosed in FIGURE 9, is illustrated in FIGURE 11. Protective tubes 141 and 142 each contain a group of five circuit relay systems as described in FIGURE 9. These are placed successively within the protective tube in the longitudinal direction thereof, and are arranged in two layers, one on top of the other. The connectors are shown protruding through the holes in front plates 143 of the protective tubes, and as explained in relation to FIGURES 6 and 7, pressed fuse glass stoppers 144 may be used to simultaneously electrically isolate the connectors from each other, and to seal the interior of protective tubes 141 and 142 from the atmosphere. Further, the protective tubes may be air-evacuated and filled with an inert gas to substantially increase the life of the various components comprising the relay circuit systems.

Magnetic flux conductors 145 comprise a return path for the magnetic field, which is applied to the individual circuit relay systems through middle cross flux conductor elements 147 upon which coils 148 are wound and through the side cross magnetic elements 146. It is seen from FIGURE 11 that cross flux conductor elements 147 are bent and flanged about protector tubes 141 and 142 to overlap the left-side air gaps of the relay systems (the lower cross flux conductor element 147 not being shown). Exciter windings 148 are wound around the mid-sections of cross magnetic elements 147, and serve to create an electromagnetic field to actuate the armatures.

The coils and magnetic coupling elements serving to actuate the right-side contacts are not shown for simplicity, but would compromise a mirror image of the left-side components illustrated. Thus, the basic relay system of FIGURES 1 and 2 can be arranged to effect simultaneous actuation of all left side contacts, or right side contacts, or both, and can be inserted in a compact efficient unit of the type illustrated in FIGURE 11.

Figure 12:
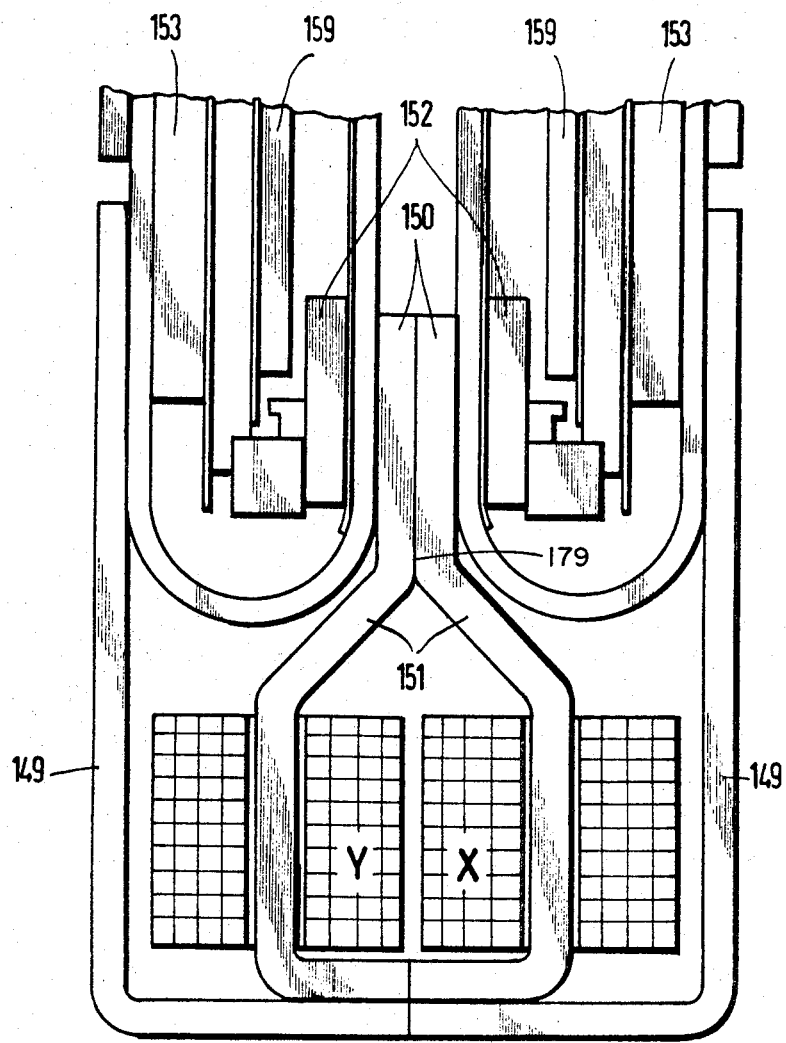
FIGURE 12 illustrates the basic relay structure system arranged to operate only upon the coincident energization of two windings and effecting actuation of all contacts on one side of the relay system.

The coincidence principle of operating the relay system was explained in relation to FIGURE 3. FIGURE 12 illustrates a practical arrangement of the relay systems comprising the basic FIGURE 9 arrangement thereof, but arranged to operate only upon coincidence of the magnetic fields. Thus, it is seen that if electromagnet X or Y is energized alone, the magnetic flux will be short circuited magnetically over magnetic core element 151. However, if electromagnets X or Y are simultaneously energized, and are poled in such a manner as to produce equal magnetic fields which are opposite in polarity at point 179, the magnetic fields created by each of the exciter windings X and Y will buck at that point. Therefore, the magnetic flux path can only be completed by flowing through magnetic flux conductor elements 150 through respective relay systems, and return to the electromagnet via outer flux conductor path 149. Thus, the armatures within the relay systems will only be magnetized and actuated upon coincident energization of windings X and Y.

It is thus seen that the FIGURE 12 arrangement is a variation of the coincidence arrangement described in relation to FIGURE 3. The FIGURE 3 arrangement provides that upon simultaneous excitation of windings 37 and 38, all contact positions will be effected; that is, both the left sided contact positions and the right sided contact positions of relay systems 14 and 15. However, the arrangement of the exciter windings X and Y as illustrated in FIGURE 12, on either leg of a substantially U-shaped core, rather than on cores on opposite sides of the relay system as illustrated in FIGURE 3, makes possible simultaneous actuation of all left sided contact positions only upon coincidence of the X and Y signals.

It is apparent also that FIGURE 12 can be provided, and normally would be provided, with associated coincidence exciter windings X′ and Y′ to provide simultaneous excitation of all right sided contact positions upon coincidence of energization of windings X′ and Y′. The right side of the FIGURE 12 system is not illustrated; but would be a mirror image of the left side components.

Figure 13:
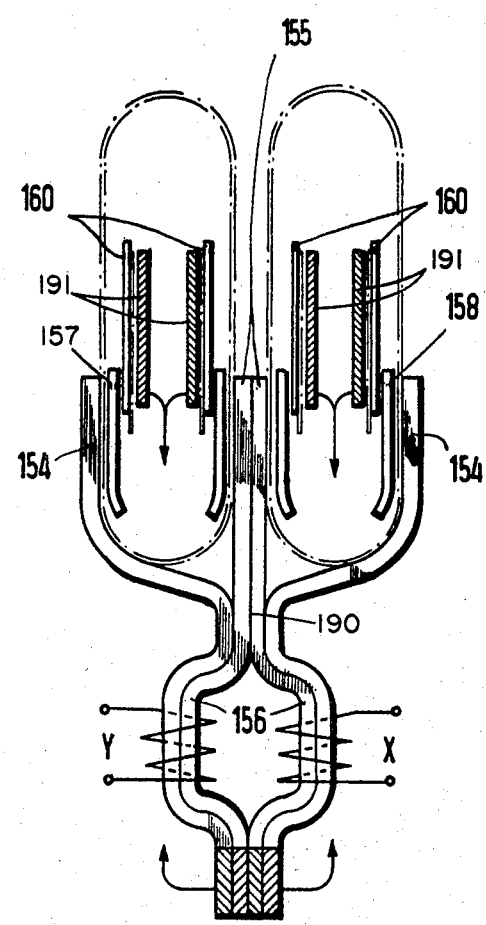
FIGURE 13 is a sectional view of the relay system disclosed in FIGURE 9, arranged to operate according to the coincidence principle.

Similarly, FIGURE 13 illustrates the basic relay circuit system of FIGURE 9, operating according to the coincidence principle. Thus, if only windings X or Y are excited, the magnetic flux will be short circuited around substantially rectangular closed core 156. However, simultaneous excitation of windings X and Y, to produce magnetic fields which are opposite in polarity at point 190 of closed magnetic core 156, will force the flux to flow in parallel relationship through flux conductor elements 155 and 154, thereby actuating the armatures 160 of the respective relay systems. The second and third pole plates are designated by numerals 158 and 158′, respectively (the latter not shown). The return for the magnetic flux from the first pole plates is completed over a flux conductor path element extending over the frontal sides of the relay systems illustrated, magnetically coupled to first pole plates 191 and back to the core 156.

It is thus seen from the foregoing examples, that the basic relay system providing four contact positions illustrated in FIGURES 1–3 is readily adaptable so that it can be mounted in a plurality of ways and utilized in a variety of circuit systems. The manufacture and assembly of the various elements comprising the relay system is simple and inexpensive, since the elements comprise essentially parallel flat stamped plates. Further, the basic relay system can be multiplied to include a plurality of co-acting relay systems, arranged in such a manner that they operate according to the coincidence principle whereby at least two windings must be excited, or two magnetic fields developed simultaneously, to actuate either all contacts, or either the left and/or right side contacts of the relay system.

Although the relay system has been described with respect to electrical operation contacts, it is apparent that rest contacts or combined contacts can also be utilized. Thus, for example, in the arrangement illustrated in FIGURE 3, a rest contact could be effected because of the fact that leaf spring 17 is insulated from the first pole plate. Therefore an additional contact link can be mounted to said first pole plate, which will be electrically connected to leaf spring 17 when the latter is in the rest position. Thus, the rest contact would be interrupted when the armature is actuated.

If permanent magnets are used to actuate the armature, these should preferably comprise U-shaped magnets, with one leg end of each of the magnets, coupled respectively to the first and second pole plates. Of course, the magnet would have to be movable to effect different contact positions. Other obvious variations of the basic relay system can also be made, and this invention relates to such conventional changes.

Having thus described the invention, I claim the following:

1. A magnetically actuable relay structure comprising:
   a first magnetizable pole plate (16),
   second (19) and third (20) magnetizable pole plates spacedly positioned in the same plane,
   the first and second pole plates, and the first and third pole plates, respectively, defining first (25) and second (26) air gaps therebetween,
   a magnetizable armature (18) having first and second ends,
   support means (17) connected to the magnetizable armature (18) to selectively position the first and second ends within the first and second air gaps in response to the magnetic fields produced therein,
   magnetization means (37, 38) to selectively produce a first magnetic field only, between the first and second pole plates to magnetize the first end of the armature and actuate the first and second ends of the armature to contact the second and first pole plates respectively; and to selectively produce a second magnetic field only, between the first and third pole plates to magnetize the first end of the armature and actuate the first and second ends of the armature to contact the first and third pole plates respectively; and to selectively produce the first and second magnetic fields simultaneously to magnetize and actuate the first and second ends of the armature to contact, respectively, the second and third pole plates.

2. The magnetically actuable relay structure described in claim 1 wherein the support means (29) comprises a leaf spring (17) pivotably fixed to the first pole plate, the armature being pivotably fixed to the leaf spring.

3. The magnetically actuable relay structure described in claim 2, further comprising:
   a leaf spring (17) pivotably fixed to the first pole plate, the armature being pivotably fixed to the leaf spring.

4. The magnetically actuable relay structure described in claim 3 wherein the first, second, and third pole plates, and the armature and leaf spring comprise substantially flat plates.

5. The magnetically actuable relay structure described in claim 4 further comprising first (21) and second (22) contact links,
   the leaf spring further comprising first (23) and second (24) contact arms on each end thereof, actuation of the first end of said armature to contact said second pole plate simultaneously forcing the first contact arms into electrical contact with the first contact links, and actuation of said second end of said armature to contact the second pole plate, simultaneously forcing the second contact arms into electrical contact with the second contact links.

6. The magnetically actuable relay structure described in claim 5 wherein the simultaneous development of the first and second magnetic fields magnetizes and actuates the first and second ends of the armature to contact the second (19) and third (20) pole plates respectively and to simultaneously force the first (23) and second (24) contact arms to be electrically connected to the first (21) and second (22) contact links respectively.

7. The magnetically actuable relay structure described in claim 5 wherein the first and second contact arms extend from said leaf spring and are of sufficient length to be outside the first and second air gaps, respectively, said first and second contact arms, and said first and second contact links comprising electrical conducting material, the electrical circuit between the contact arms and contact links thereby being isolated from the magnetic circuits across the first and second air gaps.

8. The magnetically actuable relay structure described in claim 5 wherein the first and second contact arms comprise double contacts.

9. The magnetically actuable relay structure described in claim 5 wherein the first and second contact links comprise conducting arms electrically and mechanically fastened to the first and second pole plates, respectively.

10. The magnetically actuable relay structure described in claim 1 wherein the first, second, and third pole plates and the armature comprise electrical conducting materials, the first pole plate being insulated from the second and third pole plates, thereby effecting electrical connections between first pole plate and the second pole plate when only the first magnetic field is produced, and between the first pole plate and the third pole plate only when the second magnetic field is produced.

11. The magnetically actuable relay structure described in claim 1 further comprising a non-magnetizable housing (34) completely enclosing the relay structure and sealing it from the atmosphere.

12. The magnetically actuable relay structure described in claim 11 wherein air is evacuated from the housing.

13. The magnetically actuable relay structure described in claim 12 wherein an inert gas is contained with the housing.

14. The magnetically actuable relay structure described in claim 11 wherein the housing comprises a capsule, the capsule having end plates (86, 87) defining openings,
   connection lines (88, 94) for the relay structure extending through said openings, said openings being sealed from the atmosphere, and the connection lines being insulated from each other by fused glass stoppers pressed into said openings, and surrounding each of said connection lines.

15. The magnetically actuable relay structure described in claim 11 wherein the relay structure is inserted into the housing under pressure.

16. The magnetically actuable relay structure described in claim 1 wherein a plurality (14, 15) of relay structures are mechanically and electrically connected to comprise one relay circuit system.

17. The magnetically actuable relay structure described in claim 16 wherein said relay circuit system comprises a plurality of adjoining relay structures successively positioned such that the first and second air gaps of each structure are connected in series (FIGURES 8, 11).

18. The magnetically actuable relay structure as described in claim 16 further comprising first (66) and second (67) common connection lines electrically connected to the second (56–60) and third (61–65) pole plates, respectively, of the plurality of relay structures,
   individual connection lines (68–72) connected to each of the first pole plates of the plurality of relay structures,
   said magnetization means further comprising means to selectively magnetize and actuate the first and second ends of the armatures of the plurality of relay structures to selectively effect a multiplicity of through connections between the first and second common connection lines, and the individual connection lines.

19. The magnetically actuable relay structure described in claim 16 wherein at least two relay structures are positioned adjoining each other, with their respective second and third pole plates facing each other (FIGURES 3, 12).

20. The magnetically actuable relay structure described in claim 16 wherein two relay structures are positioned adjoining each other as mirror images thereof, such that their respective first pole plates face each other to form a relay system (FIGURES 9, 13).

21. The magnetically actuable relay structure described in claim 1 wherein said magnetization means comprises at least two movable permanent magnets for effecting the first and second magnetic fields.

22. The magnetically actuable relay structure described in claim 21 wherein said at least two permanent magnets each comprise substantially U-shaped magnets, said U-shaped magnets having first and second ends, the first and second ends thereof respectively magnetically coupled to the first and second pole plates, and to the first and third pole plates.

23. The magnetically actuable relay structure described in claim 1 wherein said magnetization means comprises first (36) and second magnets (38) for producing the first and second magnetic fields, respectively.

24. The magnetically actuable relay structure described in claim 23 further comprising first (35, 39, 39′) and second (36, 39, 39′) magnetic flux conductors coupled to said first and second magnetization means, respectively, each comprising substantially U-shaped cores, said U-shaped cores having first and second ends, the first and second ends thereof respectively magnetically coupled to the first (16) and second (19) pole plates, and to the first (16) and third (20) pole plates.

25. The magnetically actuable relay structure described in claim 23 wherein there are two relay structures (14, 15) positioned adjoining each other, with their respective second and third pole plates facing each other.

26. The magnetically actuable relay structure described in claim 25 wherein the first and second ends of the first and second magnetic flux conductors define air spaces therebetween.

27. The magnetically actuable relay structure described in claim 26 wherein the air spaces between the first ends of the first and second magnetic flux conductors are bridged by third (BR2) and (BR2′) magnets, and the air space between the second ends of said first and second magnetic flux conductors are bridged by a common fifth (BR1) magnet.

28. The magnetically actuable relay structure described in claim 27 wherein a plurality of relay structures are arranged successively adjoining each other such that their respective air gaps are arranged successively in series.

29. The magnetically actuable relay structure described in claim 28 further comprising first (30) and second (31) magnetizable members positioned between the first and second magnetic flux conductors and their respective first pole plates, and extending over all of said plurality of successively adjoining relay structures.

30. The magnetically actuable relay structure described in claim 27 wherein the first and second magnets are polarized such that energization of only one of said magnets results in the corresponding magnetic field being short circuited through the magnetic path comprising the first and second flux conductors, and the third, fourth and fifth magnets, and coincident energization of the first and second magnets simultaneously produces said first and second magnetic fields.

31. The magnetically actuable relay structure described in claim 23 wherein said first and second magnets each comprise,
   two windings (FIGURE 12; X, Y),
   a closed magnetic core (151), said two windings thereon and polarized such that energization of only one of said windings produces a corresponding magnetic field which is short circuited around said common closed magnetic core, and coincident energization of both windings produces bucking magnetic fields within said closed common magnetic core which combine to produce an additive electromagnetic field.

32. The magnetically actuable relay structure described in claim 24 wherein the first and second magnetic flux conductors further comprise protective housings for the relay structure.

33. The magnetically actuable relay structure described in claim 1 wherein said magnetization means comprises first and second electromagnets to produce the first and second magnetic fields, respectively.

34. The magnetically actuable relay device described in claim 33 wherein said first and second electromagnets each comprise,
   two windings (X, Y)
   a closed magnetic core (151, 156) said two windings wound thereon and polarized such that energization of only one of said windings produces a corresponding magnetic field which is short circuited around said common closed magnetic core, and coincident energization of both windings produces bucking magnetic fields within said closed common magnetic core which combine to produce an additive electromagnetic field.

35. A magnetically actuable relay device comprising four relay structures, each comprising:
a first (124; 190) magnetizable pole plate,
second (127; 157) and third (127; 158) magnetizable pole plates spacedly positioned in the same plane,
the first and second pole plates, and the first and third pole plates, respectively defining first and second air gaps therebetween,
a magnetizable armature (126; 160) having first and second ends,
new support means (125) connected to the magnetizable armature (126; 160) to selectively position the first and second ends within the first and second air gaps in response to the magnetic fields produced therein,
the four relay structures arranged in first and second relay arrangements, each having two of said four relay structures positioned adjoining each other as mirror images thereof, with respective first pole plates facing,
the first and second relay arrangements positioned adjoining each other such that respective second and third pole plates of one of the two relay structures comprising the first and second relay arrangements face each other,
first (132; X, Y) and second (132'; X', Y') magnetization means to selectively produce first and second magnetic fields between the first and second pole plates, and the first and third pole plates, respectively, to magnetize and actuate the first and second ends of the armatures of the four relay structures, to selectively contact their associated second and third pole plates, respectively.

36. The magnetically actuable relay device described in claim 35 wherein said first and second electromagnets each comprise,
two windings (X, Y)
a closed magnetic core (156) said two windings wound thereon and polarized such that energization of only one of said windings produces a corresponding magnetic field which is short circuited around said common closed magnetic core, and coincident energization of both windings produces bucking magnetic fields within said closed common magnetic core which combine to produce an additive electromagnetic field.

References Cited
UNITED STATES PATENTS

| | | | |
|---|---|---|---|
| 1,541,618 | 6/1925 | Brown | 335—78 |
| 3,217,640 | 11/1965 | Bradshaw | 335—81 |
| 3,349,373 | 10/1967 | Kleist | 335—81 |

BERNARD A. GILHEANY, *Primary Examiner.*

H. BROOME, *Assistant Examiner.*